United States Patent

Leckel et al.

[11] Patent Number: 6,043,883
[45] Date of Patent: Mar. 28, 2000

[54] WAVEMETER AND AN ARRANGEMENT FOR THE ADJUSTMENT OF THE WAVELENGTH OF THE SIGNALS OF AN OPTICAL SOURCE

[75] Inventors: Edgar Leckel, Jettingen; Emmerich Mueller, Aidlingen; Clemens Rueck, Bondorf, all of Germany

[73] Assignee: Hewlet-Packard Company, Palo Alto, Calif.

[21] Appl. No.: 09/050,484

[22] Filed: Mar. 30, 1998

[30] Foreign Application Priority Data

May 2, 1997 [EP] European Pat. Off. .............. 97107247

[51] Int. Cl.$^7$ ................................ G01B 9/02; G01J 3/45; G01N 21/00
[52] U.S. Cl. .......................... 356/346; 356/345; 356/349; 356/72
[58] Field of Search ..................................... 356/346, 349, 356/345, 72

[56] References Cited

U.S. PATENT DOCUMENTS 5,822,049  10/1998  Dimmick ................................... 356/72
5,841,536  11/1998  Dimmick ................................. 356/346

FOREIGN PATENT DOCUMENTS

WO95/02171  1/1995  WIPO .
WO95/20144  1/1995  WIPO .
WO95/10759  4/1995  WIPO .

OTHER PUBLICATIONS

Optics Communications, vol. 14, No. 4, Aug. 1975, pp. 438–441, P. Juncar et al., "A New Method for Frequency Calibration and Control of a Laser".

*Primary Examiner*—Frank G. Font
*Assistant Examiner*—Roy M. Punnoose

[57] ABSTRACT

This invention relates to a wavemeter and an apparatus for the adjustment of the wavelength of a laser source. The invention proposes a wavemeter comprising an optical component, which generates an optical beam with a wavelength which depends on the optical power of the incident beam to be measured. To increase the precision of the wavelength measurement, the wavemeter is provided with a second measurement channel, whose optical signals are retarded by $\pi/2$ relative to the optical signals in a first measurement channel. The first and second measurement channels either each comprise a different etalon or the wavemeter comprises a single retardation plate to obtain the desired retardation. After calibration of the wavemeter, the optical power of the beam generated by the optical component is measured, the measured value of the optical power is compared with the power values of the calibration data and the wavelength in the calibration data corresponding to the measured value of the optical power is determined. A controller, such as a PC, compares the measured wavelength with the desired wavelength and automatically adjusts the wavelength of the signals generated by the laser source.

7 Claims, 4 Drawing Sheets

WAVEMETER AND AN ARRANGEMENT FOR THE ADJUSTMENT OF THE WAVELENGTH OF THE SIGNALS OF AN OPTICAL SOURCE

FIELD OF THE INVENTION

This invention relates to equipment in the field of optical communication networks and, more particularly, to a wavemeter and an arrangement for the adjustment of the wavelength of the signals of a laser source.

BACKGROUND OF THE INVENTION

Basically, in optical communication networks information is transmitted by use of a light source (transmitter), an optical fiber and an optical receiver. Typical wavelengths used for optical communication are wavelengths in the range of 850 to 1650 nm, and particularly laser diodes with a wavelength in the range of 850 nm, 1300 nm and 1550 nm are used as light sources.

In wavelength-division-multiplexing (WDM) optical communication systems, information is transmitted simultaneously by a set of laser sources, each generating coherent light with a different wavelength (optical communication channels). Since the bandwidth of optoelectronic transmitters and receivers is limited, narrow channel spacing (typically 1.6 nm) is needed to increase the transmission capacity by using a multiplicity of communication channels. Particularly, in WDM systems there is a need to adjust the wavelength of each laser source very precisely to avoid channel interferences at narrow channel spacing etc.

To adjust the wavelength of the signals of a laser source, it is known to use an expensive and very precisely measuring wavemeter comprising a well-adjusted and complex mechanical arrangement. The wavelength of the signals of the laser source is measured, compared with a desired value by a controller, such as a PC, and the wavelength of the signals of the laser source is automatically adjusted to the desired wavelength.

WO 95/02171 discloses a Fourier-transform spectrometer which contains a birefringent optical component, removing the need for a Michelson interferometer used in conventional instruments. A suitable birefringent element, such as a Wollaston prism, is used to introduce a path difference between two light polarisations. Use of an extended light source so that all areas of the birefringent component are illuminated simultaneously ensures that different positions on the birefringent component correspond to different path differences between the two polarisations. A Fourier-transform of the resulting interferogram at the detector results in the spectral distribution of the input light being obtained. The use of an extended light source permits a Fourier-transform spectrometer with no moving parts to be achieved.

P. Juncar et al: "A new method for frequency calibration and control of a laser", OPTICS COMMUNICATIONS, Vol. 14, No. 4, August 1975, Amsterdam NL, pages 438–441, XP002041763 discloses a method for high-precision measurement of the wavenumber of monochromatic radiation emitted by a single-mode tunable laser. The described apparatus allows a direct measurement of the wave number, and serves as a reference for the stabilization and piloting of the laser frequency.

WO 95/20144 discloses an optical wavelength sensor which consists of a wedge shaped Fabry Perot etalon which exhibits resonance for different optical wavelengths across its width, and an array of detectors that detects the spatial disposition of resonant peaks which occur in the etalon, for comparison with stored peak patterns in a processor, so as to determine the spectral content of the incident light from an optical fiber.

WO 95/10759 discloses a spectal wavelength discrimination system and method which allow the wavelength of a beam of radiation to be accurately determined. The system comprises an optical system for gathering and directing received radiation; a wavelength selective beamsplitter, termed a Linear Wavelength Filter, for directing predetermined fractions of the beam at each wavelength into each of two output beams; a detector for receiving each output beam to sense the intensity of each output beam; and a computer for determining the wavelength of the received radiation. Intensity measurement of the output beams and selected system parameters, including the beamsplitter spectral characteristics and detector sensitivity characteristics are unsed in a special algortihm for performing Fourier based wavelength-dispersive analysis. The unique solution of the Fourier based analysis is the wavelength of the beam of radiation.

It is an object of the present invention to provide an inexpensive wavemeter which is insensitive to a large extent against adverse influences under conditions to be met in practice.

Another object of the invention is to provide an inexpensive arrangement for the automatic adjustment of the wavelength of the optical signals of a laser source.

SUMMARY OF THE INVENTION

A wavemeter for the measurement of the wavelength of a first optical beam according to the invention comprises the features according to claim 1.

The optical power of an optical source can be measured precisely and inexpensively by use of a photo detector, such as a photo diode. The core of the invention is to propose a wavemeter in which the entire optical beam to be measured or a part of it is directed on an optical component, which generates an optical beam with an optical power which depends on the wavelength of the incident beam to be measured. After the calibration of the wavemeter according to the invention, the optical power of the beam generated by the optical component is measured by a photo detector, the measured value of the optical power is compared with the power values of the calibration data of the wavemeter and the wavelength in the calibration data corresponding to the measured value of the optical power is determined. Accordingly, an inexpensive and precise measurement of the wavelength of the signals of an optical source, such as a laser source, can be carried out by the measurement of an optical power.

According to a first embodiment of the invention, the first and/or second optical component is an etalon. Etalons are plane parallel plates of glass or fused quartz with reflecting surfaces. The etalon is arranged in the optical beam to be measured or in a part of this beam and the etalon generates an optical signal, whose optical power depends on the wavelength of the optical beam to be measured. After calibration, the optical power can be measured by use of a photo detector and the wavelength corresponding to the measured optical power is determined.

Etalons show a dependency of the generated optical power, which oscillates with increasing wavelength of the incident optical beam. Generally, an etalon shows a dependency of the generated optical power versus wavelength, which can be described by the use of trigonometric functions, particularly by a sine or cosine curve. The dependency is increased by using an etalon with high reflecting surfaces.

If the mathematical description of the dependency of optical power versus wavelength is known or determined, the effort to be spent for calibration and determining the calibration data of the specific wavemeter with an etalon or a birefringent optical component can be drastically reduced to the determination of a few calibration data or a few points on a calibration curve. Afterwards, these calibration data or the few points on a calibration curve are used to determine the missing calibration data or points on the calibration curve for the specific wavemeter by the aid of well-known mathematical interpolation techniques. Particularly, a calibration is necessary due to tolerances of the dimensions of the etalon and the arrangement of the other optical components of a wavemeter.

Since the proposed optical components allow to build precise wavemeters either with one or more etalons or with a single birefringent optical component, which have very small dimensions, the wavemeters according to the invention can be entirely kept at a predetermined temperature under operating conditions by use of a peltier element or any other cooling unit. This allows reproducible measurements of the wavelength. Preferably, calibration data are determined for this predetermined temperature.

In addition, the wavemeter according to the invention does not comprise components which are moved during operation of the wavemeter. In comparison to known wavemeters, which comprise such components, negative mechanical influences during operation of the wavemeter do not influence the measurement of a wavelength to a large extent.

In a second embodiment of the invention a data processor is used to compare the detected optical power value with the power data of the calibration data or the calibration curve and the data processor allocates the corresponding wavelength, which may be displayed to an operator and/or may be used to control the wavelength of the optical signals of the optical source. Since the wavemeter according to the invention has very small dimensions, it can be implemented in an optical source for the control and/or the stabilization of its wavelength.

A third, preferred embodiment of the wavemeter according to the invention comprises a photo detector, which detects the optical power of the beam or a part of it, which is directed on the etalon. Instead of using the detected power generated by the etalon directly for the determination of the corresponding wavelength, the ratio of the detected power generated by the etalon and the optical power of the beam or of a part of it being directed on the etalon is used. By this normalization according to the invention, it can be avoided that a variation of the optical power generated by the optical source influences the precision of the measurement of the wavelength and a correct allocation of the detected optical power generated by the etalon to a value of the calibration data or curve can take place. It is understood and expressly noted that when making use of this preferred embodiment, calibration is carried out by making use of the mentioned ratio of the detected power generated by the etalon and the optical power of the beam or of a part of it being directed on the etalon.

In a first alternative of the invention for providing a second measurement channel, the second channel comprises a second etalon with a different optical thickness with regard to the first etalon in the first measurement channel. Preferably, like the first etalon, the second etalon is provided with reflecting surfaces to increase the precision of the wavelength measurement.

A part of the optical beam from the optical source is directed on the second etalon, which like the first etalon, is characterized by generating a beam with an optical power depending on the wavelength of the incident beam. Another part of the optical beam from the optical source is directed on the first etalon. According to the invention, the second etalon generates an optical beam which comprises a retardation relative to the optical beam generated by the first etalon. Preferably, a second etalon is chosen according to the invention, which is characterized by a retardation (phase shift) of $\pi/4 \times N$; $N=1, 3, 5 \ldots$ for the electrical field resulting in a $\pi/2$ phase shift of the optical power intensity.

Like in the first channel, the detected optical power of the second channel is preferably normalized by the detected optical power of the beam or a part of it which is directed on the second etalon to eliminate influences from a variation of the power of the optical source. In addition, calibration is carried out like for the first channel. Preferably, the normalized dependency of optical power versus wavelength of both channels is used to determine the ratio of the optical power in the first channel and the optical power in the second channel versus wavelength.

When using etalons in the first and second channel and for the preferred retardation of $\pi/4$, the ratio can be described by a tangent-function, while the normalized optical power in the first channel can be described by a sine function and the normalized optical power in the second channel can be described by a cosine function. The use of a further channel and the retardation of $\pi/4$ allows to calibrate the wavemeter according to the invention by the aid of a tangent-function. Within the free spectral range (FSR) of $2/\pi$, the tangent function is a steep straight-line (in other words it is a line with a strong gradient), which does not compromise reversal points like the sine- or cosine-function. Accordingly, calibration can be carried out by the measurement/determination of the ratio of the optical power in the first and second channel for a few different wavelengths. The power ratio for the wavelengths not measured/determined can be easily interpolated by well-known mathematical techniques.

In addition, the use of a tangent-function for calibration of the wavemeter according to the invention allows more easily to allocate the correct wavelength to the measured/determined optical powers in both channels, which results in a very precise measurement of the wavelength of the optical signals generated by the optical source.

In a second, preferred alternative of the invention for providing a first and second measurement channel, only a single birefringent optical component, such as a retardation plate or a waveplate, comprising a "fast axis" for light with a first polarization axis and a "slow axis" for light with a second polarization axis is used. The optical beam or a part of it whose wavelength shall be measured/determined passes the single birefringent optical component and a polarization beamsplitter arranged behind the single birefringent optical component separates the light from the single birefringent optical component into two beams according to the said polarizations. The use of a single birefringent optical component with a fast and a slow axis instead of a solution with two physically separated etalons allows a further reduction of the dimensions of the wavemeter according to the invention. In addition, such single birefringent optical component, like a waveplate or retardation plate, is available for a reasonable prize and the combination in a single component has the further advantage that the amount of components of a wavemeter can be reduced. This allows an easier adjustable arrangement. As the embodiment of the invention comprising two separated etalons, the single birefringent optical component preferably is chosen to cause a retardation (phase shift) of $\pi/4$ for light with a first polarization axis (in the first measurement channel) relative to light with a second polarization axis (in the second measurement channel) or of $\pi/4 \times N$; N=1, 3, 5, . . . . Such a birefringent optical component is also known as a $\lambda/8$-waveplate. To achieve a phase shift of $\pi/4$ over a large wavelength range it is preferred to choose N=1. In this case the birefringent optical component is also known as a zero-order waveplate.

It will be understood and is expressly noted that normalization and calibration by use of a tangent function, as described with regard to the first alternative when using two physically separated etalons, also applies to the use of a single birefringent optical component in the second, preferred alternative for providing a second measurement channel. As mentioned before, the surfaces of the birefringent optical component are preferably coated with a high reflecting coating to increase the wavelength sensitivity.

The invention further proposes an arrangement for the adjustment of the wavelength of a laser source which comprises a wavemeter according to the invention, a comparator and a tuning unit. The present wavelength of the signals of an optical source, such as a laser source, is measured by the wavemeter and compared by the comparator with a preadjusted or desired wavelength. If the wavelength deviation exceeds a certain amount, the comparator causes the tuning unit to change the adjustment of the laser source to generate an optical beam with the desired or the preadjusted wavelength.

According to one embodiment of the invention, where a laser diode is used, a comparator generates a control signal changing the drive current of the laser diode or preferably, changing the temperature of the laser diode and/or changing another appropriate parameter of the laser diode. For changing the temperature of the laser diode a peltier element may be used.

According to another embodiment of the invention, where the wavelength of an external cavity laser (ECL) is controlled by the arrangement according to the invention, the tuning unit triggers the adjustment of the dimension of the cavity and/or the position of a wavelength sensitive filter in the laser cavity and thereby adjusts the wavelength of the signals of the laser source to a desired or preadjusted value.

It is understood and expressly noted that the present invention relates to all useful and novel combinations of the above disclosed features, whether alone or in any other arbitrary combination. Furthermore, all cited advantages can be seen as objects solved by the invention in its entirety.

BRIEF DESCRIPTION OF THE DRAWINGS

For better understanding of the present invention, together with other and further objects, advantages and capabilities thereof, reference is made to the accompanying drawings, which are incorporated herein by reference and in which.

Figure 1:
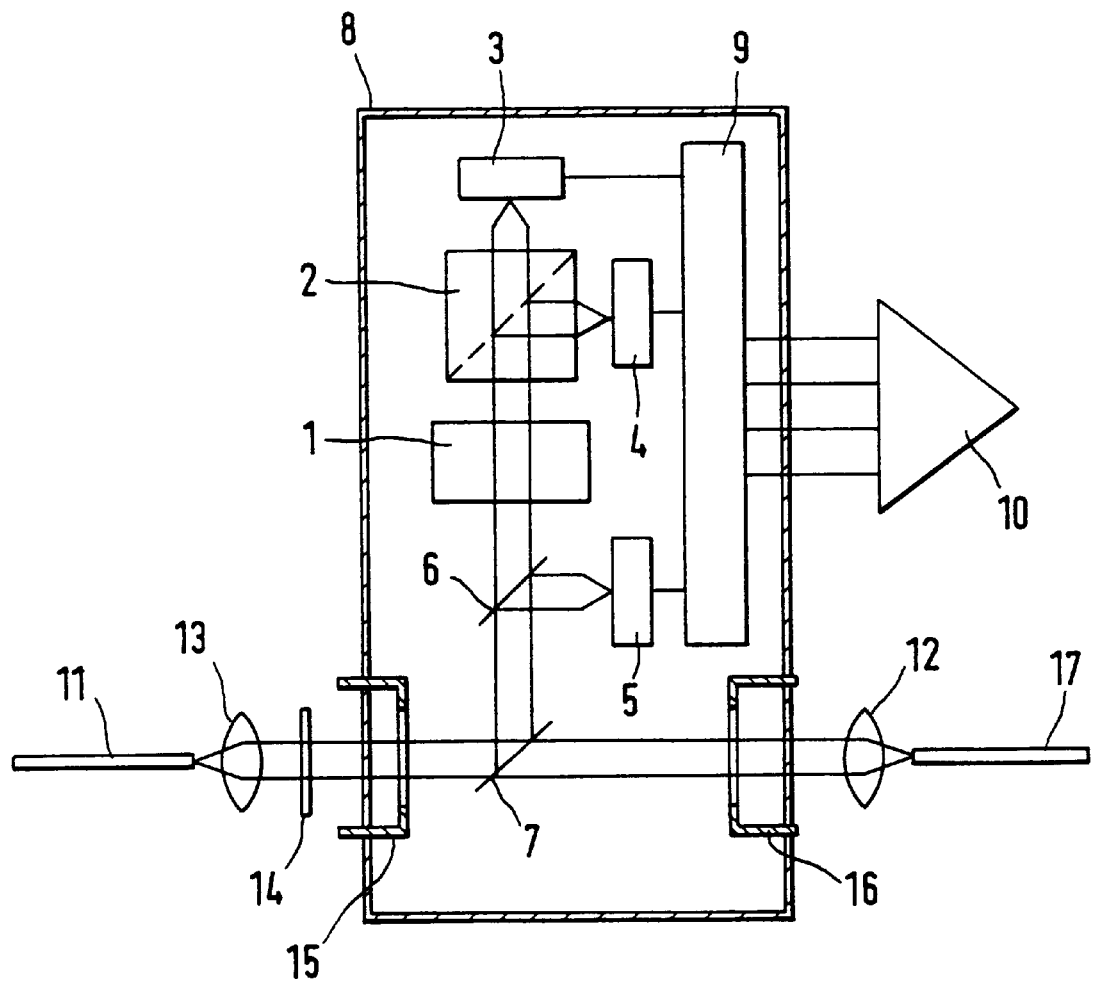
FIG. 1 is a wavemeter according to the invention.

A wavemeter according to FIG. 1 comprises a housing 8, an entrance window 15, a beamsplitter 7 (5%), a beamsplitter 6 (50%), a birefringent retardation plate 1, a polarization beamsplitter 2, a photo diode 3, a photo diode 4, a photo diode 5, an electric circuit 9, a connector 10 to a data processor (not shown) and an exit window 16.

A beam of coherent light from an optical source (not shown) is led to a beamsplitter 7, directing about 5% of the incoming coherent light into the wavemeter for measuring the wavelength of the incoming beam. On its way to the beamsplitter 7, the beam passes an optical fiber 11, a micro-objective 13, a polarizer 14 and an entrance window 15. The end of the optical fiber 11 adjacent to the wavemeter is in the focus of the micro-objective 13 and the micro-objective generates a parallel beam which is directed to the beamsplitter 7. The beamsplitter 7 directs about 5% of the incoming beam to the beamsplitter 6, which directs about 50% of the beam to the photo diode 5 detecting the optical power entering the arrangement for the measurement of the wavelength.

The other 50% of the beam's light power, comprising light with a first and a second polarization, passes the beamsplitter 6 and reaches the retardation plate 1. The retardation plate is chosen so that it causes a retardation of $\lambda/8$ corresponding to a phase shift of $\pi/4$ for the light with the first polarization with regard to the light with the second polarization. The retardation plate 1 comprising a "fast axis" and a "slow axis" retards light with a polarization being parallel to the slow axis by $\pi/4$ relative to light with a polarization being parallel to the fast axis.

The beam passing the retardation plate 1 reaches the polarization beamsplitter 2 separating the recombined beam from retardation plate 1 into two beams each having different states of polarization corresponding to the said polarization of the retardation plates. The first beam from polarization beamsplitter 2 is focused on the photo diode 4 while the second beam from polarization beamsplitter 2 is focused on the photo diode 3. Each of the photo diodes 3 and 4 detect the presence of a beam and generate an electrical current which depends on the optical power of the light reaching the photo diodes 3 and 4 respectively. The electrical current of each of the photo diodes 3, 4 and 5 is applied to an electric circuit 9. The electric circuit 9 is built up with operational amplifiers, which amplify the electric current generated by the photo diodes. The electric circuit 9 comprises electrical connections to a connector 10 which connects the outputs of the electric circuit 9 with a data processor (not shown).

The wavelength of the optical beams from the retardation plate 1 depends on the optical power of the beam measured by the photo diodes 3, 4 and 5 as will be explained in more detail by FIGS. 4, 5, 6 and 7.

Figure 2:
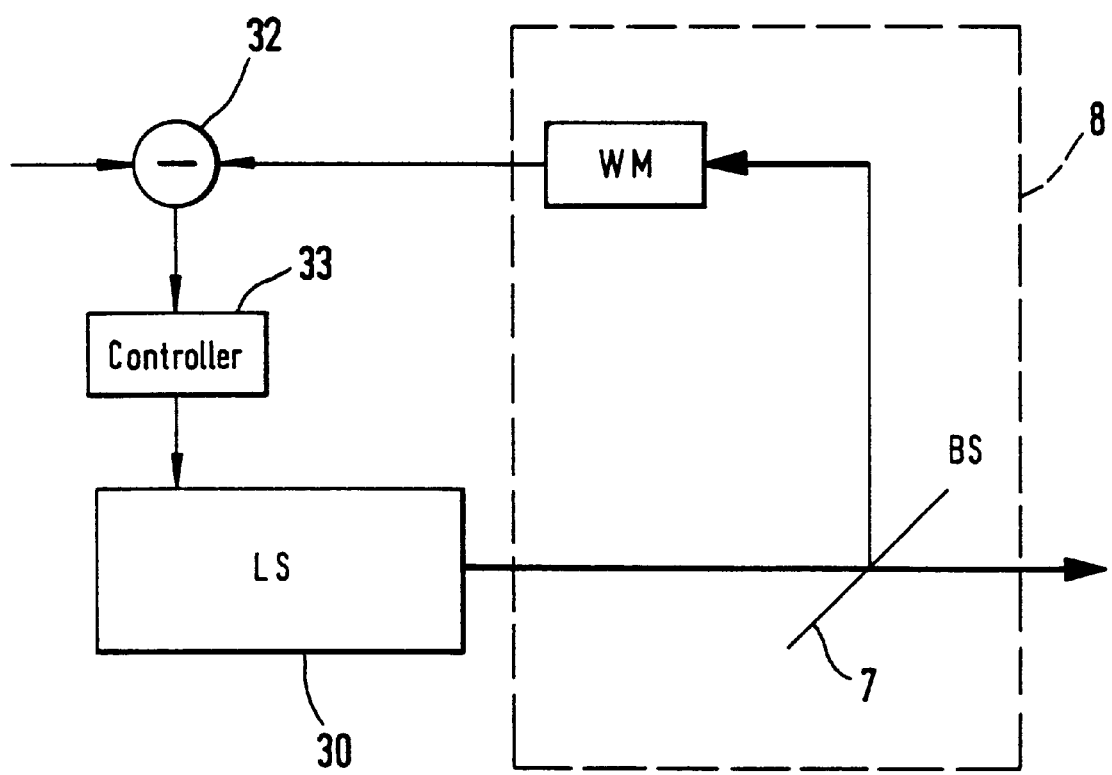
FIG. 2 is an arrangement for the control of the wavelength of the optical signals of a laser source.

An arrangement according to the invention for the adjustment of the wavelength of a laser source is shown in FIG. 2 in schematic view. The arrangement comprises a laser source 30, a calibrated wavemeter WM as shown in FIG. 1 and indicated by its housing 8, a comparator 32 and a controller 33. The output signal of laser source 30 passes the beamsplitter 7 of the wavemeter in FIG. 1 and about 5% of the light power of the output signal reaches the wavemeter according to the invention as explained with regard to FIG. 1. After calculating the present wavelength by a data processor (not shown), the present wavelength is compared with the preadjusted wavelength of the laser source 30 by a comparator 32. In case that the deviation between preadjusted and present wavelength exceeds a predefined amount, the comparator 32 generates an error signal, which may depend on whether the present wavelength is too large are too small in comparison to the preadjusted wavelength. The error signal triggers a controller 33 generating a control signal which causes the laser source to increase or decrease the wavelength of the generated output, depending on the deviation between present and preadjusted wavelength.

In order to avoid negative thermal influences caused by temperature changes of the environment in which the wavemeter according to the invention may be used, the wavemeter according to FIG. 1 is provided with a temperature stabilization, such as a peltier cooler (not shown). The peltier cooler is in thermal connection with the housing 8 of the wavemeter, which preferably is made of steel, and the cooler stabilizes the temperature within a range of about ±0.1° C. around a preadjusted temperature.

Figure 3:
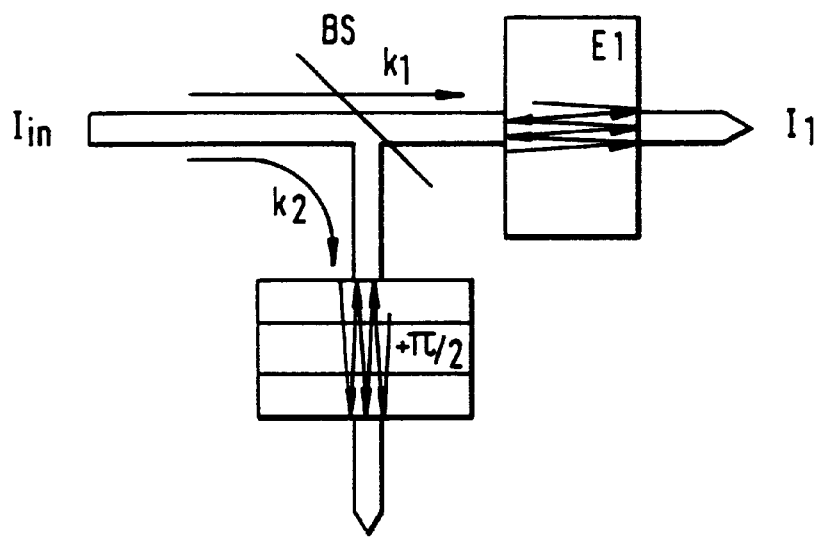
FIG. 3 shows the principle of the invention, when using two physically separated etalons E 1 and E 2.

FIG. 3 shows the principle of a wavemeter according to the invention, when using two physically separated etalons E 1 and E 2 instead of the single birefringent optical component as shown in 1 in FIG. 1. Later on, by FIG. 4 the more complex principle of the wavemeter comprising a single retardation plate 1 as shown in FIG. 1 will be explained. An optical beam $I_{in}$, whose wavelength shall be measured is separated by a beamsplitter BS into two beams. The first beam $k_1$ is directed on the etalon E 1, is multiple times reflected within the etalon E 1 and the optical beam from E 1 is designated with $I_1$. The second beam $K_2$ is directed on the etalon E 2, is multiple times reflected within the etalon E 2 and the optical beam from E 2 is designated with $I_2$. The light intensity or optical power of the beams $I_1$ and $I_2$ depends on the wavelength of the beam $I_{in}$. The result of a conversion of the beams $I_1$ and $I_2$ by the aid of photo diodes 3 and 4, shown in FIG. 1, is an electrical current with a dependency of the electrical current on the wavelength of the beams such as shown in the two diagrams of FIG. 5. With increasing wavelength the electrical current generated by the photo diodes 3 and 4 oscillates and the dependency of the electrical current on the wavelength of the beams can be described by a sine- or cosine-function.

Accordingly, after calibration, by the measurement of the electrical current generated by a photo diode, which is arranged in the beam $I_1$ or $I_2$, the wavelength of the beam being directed on the photo diode can be determined by a comparison of the calibration data (electrical current as a function of the wavelength) with the measured electrical current and by allocating the corresponding wavelength on the basis of the calibration data. Because of the periodicy of the dependency of the electrical current on the wavelength of the beam (to be seen from FIG. 5), a correct allocation of the wavelength corresponding to the measured electrical current, can only be made if the measured wavelength is within the so called free spectral range (FSR) and one knows in which wavelength range (FSR) the measured wavelength can be expected.

In order to increase the accuracy of the wavelength measurement, two etalons E 1 and E 2 are used to obtain two measurement channels. Preferably, the etalon E 2 causes a phase shift of π/2 of the intensity of the beam $I_2$ relative to the intensity of the beam $I_1$. Accordingly, the curve of the electrical current generated by the photo diode converting the light intensity of beam $I_2$ versus the wavelength of the beam $I_2$ comprises a phase shift of π/2 relative to such curve for the light intensity of the beam $I_1$. The phase shift π/2 between the two curves of electrical current versus wavelength for both channels can be seen from FIG. 5 (in FIG. 5 the curve of the electrical current generated by the respective photo diode converting the light intensity of the beams $I_1$ and $I_2$, is a normalized curve, which means that it shows the ratio of measured electrical current and the current generated by the photo diode 5 in FIG. 1 to obtain a curve which is independent from time dependent variations of the optical power of the laser source).

Figure 6:
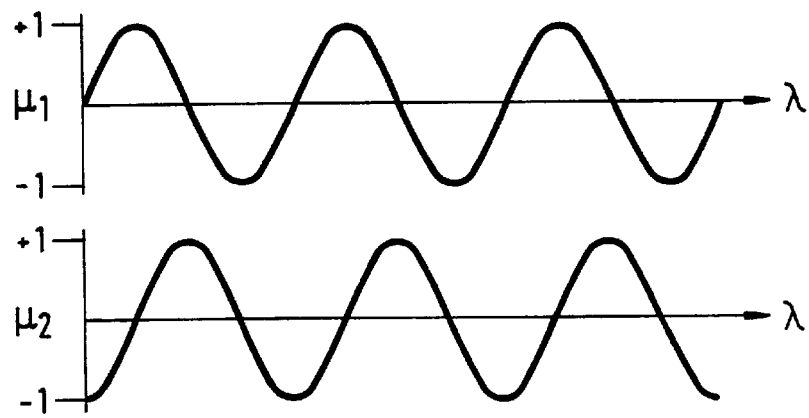
Figure 7:
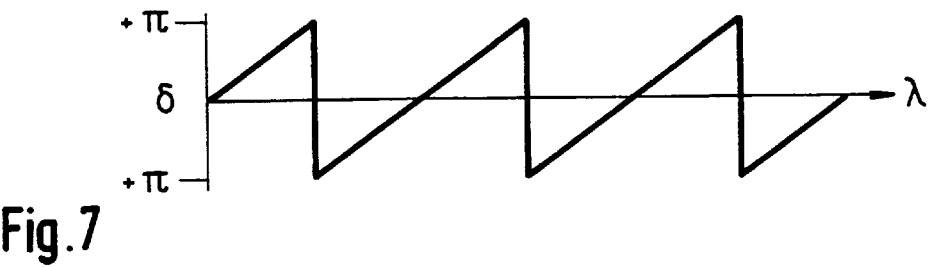

The use of a second measurement channel and the retardation of π/4 of the electrical field allows to calibrate the wavemeter with two physically separated etalons according to the invention by the aid of a tangent-function such as shown in FIG. 7 for the wavemeter in FIG. 1 making use of a single birefringent optical component. The curve in FIG. 7 shows the ratio after a few mathematical transformations as described with regard to FIGS. 5 and 6 of the electrical current generated by the photo diode in the first measurement channel and the electrical current generated by another photo diode in the second measurement channel versus wavelength. Within the free spectral range (FSR) of 2 π, the tangent function is a line with a strong gradient, which does not comprise reversal points like the sine- or cosine-function describing the electrical current generated by the photo diodes in the measurement channels versus wavelength and shown in FIG. 5 in the normalized representation of the light power between a range of 0 and +1. FIG. 6 shows the curves for the two measurement channels of FIG. 5 within a range for the light power of −1 and +1, which is obtained from FIG. 5 by taking offsets into account.

A phase difference of the intensity of π/2 can be achieved by multiple reflection of the two optical beams within each etalon. Herein the etalons must be built up with prisms and the beams must be p- and s-polarized corresponding to a reflective surface of the prisms. The internal angle of incidence must be at an appropriate value to achieve the π/2 phase shift per round trip.

Alternatively, etalon 2 may comprise an optical thickness which is enlarged by ë/8 relative to etalon 1 according to the formula:

$$d_2 = d_1 + \ddot{e}/8$$

where:

$d_1$ is the geometric thickness of etalon 1,
$d_2$ is the geometric thickness of etalon 2 and
ë is the expected wavelength of the optical signals of the optical source.

Further, a different material for etalon 2 may be chosen which comprises a refractive index given by the formula:

$$n_2 = n_1 - \ddot{e}/(8\, d_2)$$

where:

$n_2$ is the refractive index of etalon 2,
ë is the expected wavelength of the optical signals of the optical source and
$d_2$ is the geometric thickness of etalon 2.

Figure 4:
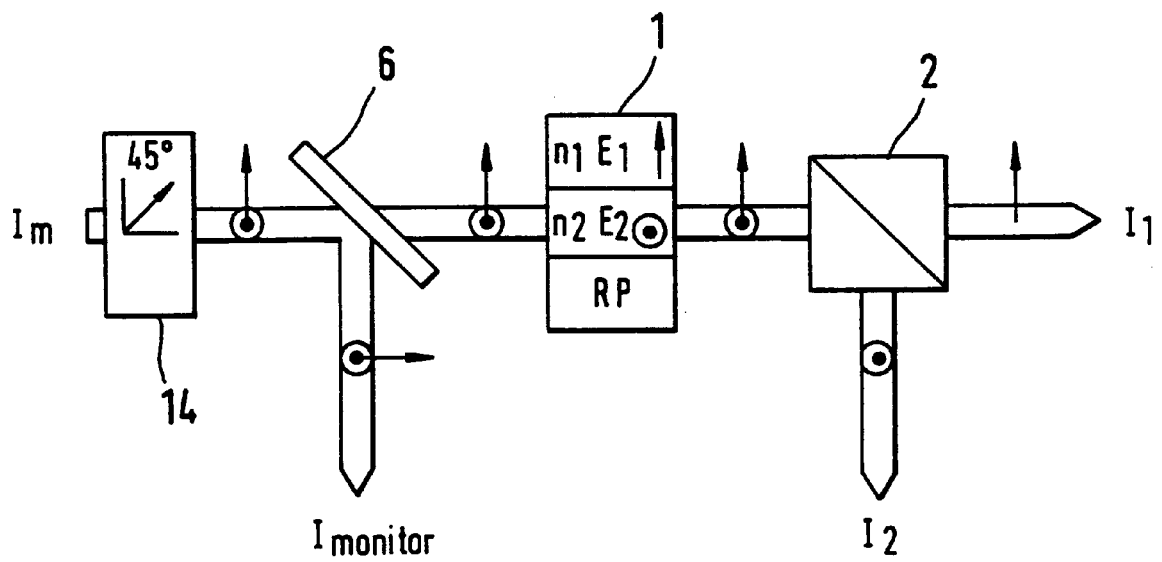
FIG. 4 is the principal of the invention, when using a single birefringent optical component as in the wavemeter shown in FIG. 1, FIGS. 5, 6 and 7 depict measurement data for the calibration of the wavemeter as shown in FIG. 1.

FIG. 4 shows the principle of the invention, when using a single birefringent retardation plate 1 as in the preferred embodiment of the wavemeter shown in FIG. 1. In order to achieve defined conditions, a polarizer 14 is used at the entrance of the wavemeter, which polarizes the incoming beam $I_{in}$ by a certain angular, such as by 45°. A beamsplitter 6 splits the incoming beam, directs a part of the beam I monitor on the photo diode 5 (see FIG. 1) and directs the other part of the incoming beam on the single retardation plate RP with a fast optical axis and a slow optical axis.

For easier understanding, the graphical representation of the retardation plate RP in FIG. 4 shows the combination of two etalons E 1 and E 2 as in FIG. 3. In fact, the retardation plate shows a similar optical behavior as the embodiment of the invention with two etalons, since it retards light with a first polarization relative to light with a second polarization. The different polarizations are indicated by the arrow and the dot in a circle shown in the graphical representation of the retardation plate RP. Accordingly, for light with a first polarization, the retardation plate shows a refractive index $n_1$, while it shows a refractive index $n_2$ for a second polarization due to the fast and slow axis for light with different polarizations. As in FIG. 3, a retardation plate is chosen which causes preferably a phase shift between the light with a first polarization relative to light with a second polarization of $\pi/4$ or $\pi/2$ according to the beam intensity.

The beam leaving the retardation plate 1 with a fast and slow axis, is split by a polarization beamsplitter 2 into two beams $I_1$ and $I_2$ of different polarization corresponding to the said polarization of the retardation plates. The beam $I_1$ with a first polarization is directed on laser diode 3 (see FIG. 1) and the beam $I_2$ with a second polarization is directed on laser diode 4 of FIG. 1.

Figure 5:
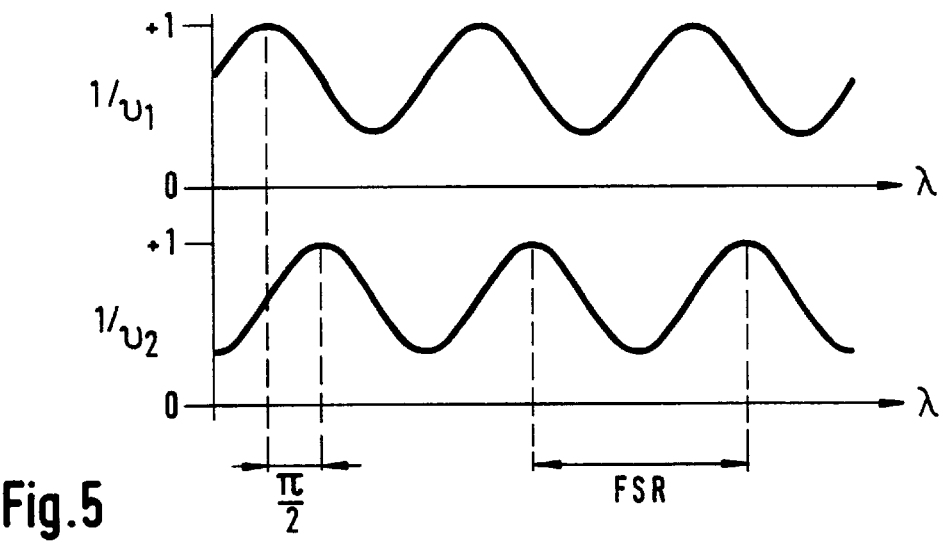

FIGS. 5, 6 and 7 depict measurement/determination data obtained during calibration of the wavemeter according to FIG. 1. It will be understood that also the principle of the invention as shown in FIG. 3 may be used without changing the calibration process. For a few wavelengths the electrical current generated by the photo diodes 3, 4 and 5 is measured after amplification by operational amplifiers in electric circuit 9. The ratio of the electrical current generated by the photo diode 3 and the electrical current generated by the photo diode 5 as well as the ratio of the electrical current generated by the photo diode 4 and the electrical current generated by the photo diode 5 is determined. The result of this calculation is shown in FIG. 5 for two measurement channels for several wavelengths to allow easier understanding. $1/\upsilon_1$ is the ratio of the electrical current generated by photo diode 3 in channel 1 caused by beam $I_1$ and $1/\upsilon_2$ is the ratio of the electrical current generated by photo diode 4 in channel 2 caused by beam $I_2$ and normalized to a light power of the respective channels in a range of 0 and +1.

The result of the calculation shown in FIG. 5 is corrected by the offset of the beam intensity according to the slow and fast axis of the retardation plate. Finally, a tangent-function $\ddot{a}$ of the ratio $\mu_2$ and $\mu_1$ within the range of $-\pi$ and $+\pi$ versus wavelength $\lambda$ of the beam to be measured is determined and shown in FIG. 7.

From a few measurements and calculations with light of different wavelengths, the calibration curve as shown in FIG. 7 or a set of calibration data can be determined by use of mathematical interpolation techniques.

When measuring the wavelength of an optical beam, the same measurements and calculations as described with regard to calibration are carried out and the value of tangent-function a is compared with the data of the calibration curve as shown in FIG. 7 or with the determined set of calibration data. The wavelength corresponding to the value of tangent-function $\ddot{a}$ is allocated and is used to control the wavelength of an optical source as described with regard to FIG. 2.

What is claimed is:

1. A wavemeter for measuring a wavelength of a first optical beam, comprising:

a first optical component which is arranged in said first optical beam or in a part of it and which generates a second optical beam with a first optical power, whereby said first optical power of said second optical beam depends on the wavelength of said first optical beam, a first power detector detecting the optical power of said second optical beam and a first allocator allocating a wavelength to said detected first optical power based on the dependency of the optical power of said second optical beam which is generated by said first optical component on the wavelength of said first optical beam to be measured, a second optical component which is arranged in said first optical beam or in a part of it and which generates a third optical beam with a second optical power, whereby said second optical power of said third optical beam depends on the wavelength of said third optical beam, a second power detector detecting said second optical power of said third optical beam, a second allocator allocating a wavelength to said detected second optical power based on the dependency of said second optical power of said third optical beam which is generated by said second optical component on the wavelength of said first optical beam to be measured, whereby said optical power generated by said first and second optical components oscillate periodically with increasing wavelength, and said third optical beam being retarded with respect to said second optical beam.

2. A wavemeter as defined in claim 1, wherein said first and/or said second optical component is an etalon or a birefringent optical component, such as a retardation plate or a waveplate.

3. A wavemeter as defined in claim 1, wherein said first and/or said second power detector detecting the optical power of said second optical beam is a photo detector, such as a photo diode.

4. A wavemeter as defined in claim 1, wherein said first and/or said second allocator is a data processor which compares the detected optical power of said second optical beam with the specific dependency of the optical power on the wavelength of said first optical component and which allocates the wavelength corresponding to the detected optical power.

5. A wavemeter as defined in claim 1, wherein said first optical component and said second optical component is realized with a single birefringent optical component, such as a retardation plate or a waveplate, retarding said third optical beam with a second polarization relative to said second optical beam with a first polarization.

6. A wavemeter as defined in claim 1, wherein said retardation corresponds to a phase shift of said second optical beam with regard to said third optical beam of $\pi/4$ of the electrical field.

7. An apparatus for the adjustment of the wavelength of an optical source, comprising:

a wavemeter as defined in claim 1, a comparator which compares the measured wavelength of said first optical beam with a predefined wavelength and a controller controlling said optical source to generate an optical beam with said predefined wavelength based on the result of the comparison carried out by said comparator.

* * * * *